United States Patent [19]

Baumgartner

[11] Patent Number: 4,793,138
[45] Date of Patent: Dec. 27, 1988

[54] HYDROSTATIC DRIVE WITH RADIALLY-NESTED RADIAL-ROLLER PUMP AND MOTOR HAVING COMMON DISPLACEMENT CONTROL RING

[75] Inventor: Hans Baumgartner, Viersen, Fed. Rep. of Germany

[73] Assignee: Pierburg GmbH, Neuss, Fed. Rep. of Germany

[21] Appl. No.: 94,397

[22] Filed: Sep. 8, 1987

[30] Foreign Application Priority Data

Sep. 8, 1986 [DE] Fed. Rep. of Germany ....... 3630514

[51] Int. Cl.[4] ............................................. F16H 39/06
[52] U.S. Cl. ........................................ 60/491; 60/487;
418/6; 418/13; 418/22
[58] Field of Search ................... 418/5, 6, 13, 16, 22,
418/30, 177; 60/382, 491, 325, 487

[56] References Cited

U.S. PATENT DOCUMENTS

| | | | |
|---|---|---|---|
| 2,434,546 | 1/1948 | Breedlove | 60/491 |
| 2,673,448 | 3/1954 | Wheeler | 60/487 X |
| 2,790,391 | 4/1957 | Holl | 418/13 X |
| 2,991,619 | 7/1961 | Powell | 60/491 X |
| 3,910,733 | 10/1975 | Grove | 418/177 X |

FOREIGN PATENT DOCUMENTS 660484 5/1938 Fed. Rep. of Germany .......... 418/6
1962613 12/1969 Fed. Rep. of Germany .

Primary Examiner—Robert E. Garrett
Assistant Examiner—George Kapsalas
Attorney, Agent, or Firm—Toren, McGeady & Associates

[57] ABSTRACT

An adjustable hydrostatic drive, particularly for the auxiliary units of motor vehicle internal combustion engines, has a pump/motor unit (2, 3) with the pump and motor arranged radially one within the other in a common housing (1) with an eccentric control ring (6) between them. The pump and motor are hydraulically connected together and have delivery volumes adjustable in opposite senses. The speed variation mechanism includes a shaft (14) driving the pump/motor unit (2, 3) which passes through the side plates (17) of the housing and rotates with one projecting end (20) in a bushing (22) having an eccentric, sickle-shaped shoulder (21) that engages in a through bore (23) in a front face (30) of the control ring (6) and an outer bushing (24) that coaxially surrounds the shaft end bushing and includes a nose (25) which projects into a radial groove (26) in the control ring (6).

5 Claims, 6 Drawing Sheets

HYDROSTATIC DRIVE WITH RADIALLY-NESTED RADIAL-ROLLER PUMP AND MOTOR HAVING COMMON DISPLACEMENT CONTROL RING

BACKGROUND OF THE INVENTION

1. Field of the Invention

The invention relates to an adjustable hydrostatic drive, particularly for auxiliary units of internal combustion engines of motor vehicles, comprising a pump and motor arranged radially one inside the other in a common housing (hereinafter referred to as a radially nested pump/motor unit), with an eccentric control ring between them, the pump and motor being hydraulically connected together and their delivery volumes being adjustable in opposite senses.

2. Description of the Prior Art

Internal combustion engines, particularly the driving motors of motor vehicles, have to provide auxiliary drives for units that serve either for the operation of the internal combustion engine itself or other purposes. Examples of units serving for the operation of the internal combustion engine itself are water pumps, fans, generators and lubricating oil pumps. For other purposes there are, for example, oil pumps for power-assisted steering, level control and air suspensions. The performance of the units has to be adequate even when the engine is idling. Some of these units always require their full, speed dependent power, while others, for example a generator and a fan with a viscous coupling, take off a controlled amount of power, and yet other units are occasionally operated at their normal power and are then switched to idling power; examples of these are compressors for air conditioning units and air suspensions.

It is known for all the units to be switched on at their maximum power. The sum of the individual powers can then reach a value such that the idling power needed from the internal combustion engine can only be provided by increasing the idling speed. An increased idling speed is however undesirable, since it increases the noise generated; when hydrodynamic converters or clutches are used the creep moment and heat of slippage are increased; and the total revolutions are increased.

So that the auxiliary units can be better served in the lower engine speed range without the need to accept excessive losses at high speeds, hydrostatic drives and hydraulic converters are known that comprise a pump and a motor. With these drives and converters the revolutions needed for the auxiliary units can be obtained by changing the delivery volume of the motor driving the auxiliary units relative to that of the pump that is rotating at the speed of the engine.

In a hydrostatic drive known from German Offenlegungsschrift No. 19 62 613 the pump and motor are in the form of vane-cell machines and are inserted radially one inside the other. Between the outer vane-cell machine that serves as the motor and the inner vane-cell machine that serves as the pump is arranged an eccentric control ring, the outer side of which cooperates with the vanes of the motor and the inner side with the vanes of the pump. According to the position in which this eccentric control ring common to the motor and the pump is set, the through-flow of fluid driving the rotor of the motor, and thus also the volume delivered by the vanes of the pump, can be altered in opposite senses, i.e. the volume delivered by the pump decreases while the volume delivered by the motor simultaneously increases, and vice versa. It is however not disclosed how the position of the control ring is changed and fixed so as to produce a variation in the revolutions.

With a wide speed range, for example a ratio of the idling to maximum revolutions of 1:10, such as occurs with a target idling speed of 600 to 650 r.p.m. and a maximum speed of 7000 r.p.m., the eccentricity needed is correspondingly large, i.e. part of the wall of the control ring must be very thick. Since the wall of the control ring is so thick, the volume occupied by the known hydrostatic drive is undesirably large, despite the radial construction.

A radially nested pump/motor unit comparable with the hydrostatic drive described above, and having the same disadvantages, is also known from U.S. Pat. No. 2 434 546.

SUMMARY OF THE INVENTION

The object of the invention is to improve the speed control of a hydrostatic drive having a pump/motor unit with the pump and motor arranged radially one within the other, in which an eccentric control ring is arranged between the pump and the motor.

According to the invention this object is achieved as follows: a shaft driving the pump/motor unit passes through the side plates of the housing and rotates with one projecting end in a bush having an eccentric, sickle-shaped shoulder that engages in a circumferential recess in an inner ring surface of the control ring, and a nose on an outer bush coaxially surrounding the shaft projects into a radial groove in the control ring. This enables an operator to vary the speed from outside the adjustable hydrostatic drive unit by moving the control ring radially or rotating it about the longitudinal axis of the drive shaft, and also to fix the control ring in position, by simply moving a control lever.

The nose (e.g. a finger, a rod or some other projection) can advantageously be arranged on the end face of the outer bush.

When the shaft end bush is locked against rotation and the control lever is fixed to the outer bush, the control ring can be rotated, since in this case, when the control lever is moved, the shaft end bush having the eccentric, sickle-shaped shoulder is held in position against rotation by the rotational locking means, for example a bracket or locking plate, fixed to the engine housing, while the outer bush is rotated and carries the control ring with it through the engagement of the nose in the control ring.

When the outer bush is locked against rotation and the control lever is fixed to the shaft end bush, the control ring can be moved radially, since in this case the outer bush is held in position by the rotational locking means. If the control lever is moved, the shaft end bush is moved on the eccentric circle formed by the sickle-shaped shoulder and raises or lowers the control ring. In this way, by rotation of the shaft end bush, and thus of the sickle-shaped shoulder, the control ring can be displaced radially by twice the amount of the eccentricity.

A compact drive comprising a radially nested pump/motor unit, which is of compact construction and yet permits a very wide speed ratio, can advantageously be realised by means of a control ring arranged between the pump and the motor and having its inner and outer ring surfaces shaped as opposed eccentric curves. While in the case of the known control rings the eccentricity is the same, i.e. the eccentric shape of both the inner and outer ring surfaces is greatest in the same direction, according to the invention the eccentricities are exactly opposite. On rotation or radial displacement of the control ring in the housing the radial distance of the outer and inner ring surfaces from the centre of a pump wheel or of the rotor of a motor, or of a drive shaft coupled thereto, is altered to a correspondingly greater extent, so that the conversion ratio, doubled by the oppositely adjustable delivery volumes of the pump and the motor, can be varied still further. Whether the enclosing, i.e. outer, drive unit operates as motor or pump depends on whether the pump/motor unit is connected to a driving shaft (e.g. a crankshaft) or to a driven shaft (e.g. in an air conditioner). When it is arranged on the driving shaft the motor will be the enclosing unit.

BRIEF DESCRIPTION OF THE DRAWINGS

The invention will now be explained in more detail with reference to the embodiment shown by way of example in the drawings, in which.

DETAILED DESCRIPTION OF PREFERRED EMBODIMENTS OF THE INVENTION

Figure 2:
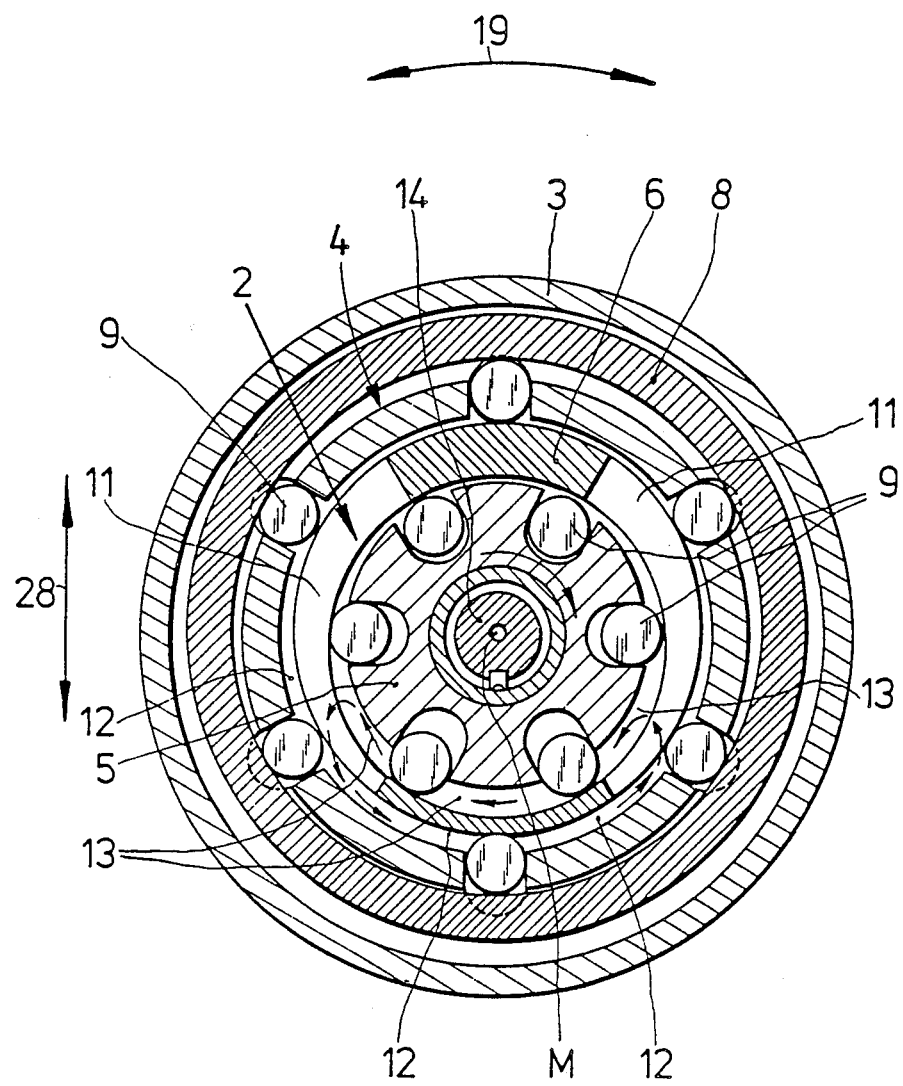
FIG. 2 is a section on the line II—II in FIG. 1.

A roller-cell pump 2 and a roller-cell motor 3 are mounted in a drive housing 1, the motor 3 and the pump 2 being built radially one inside the other with the motor 3 surrounding the pump 2. Between the motor 3 and a pump wheel 5 of the roller-cell pump 2, rotating at the speed of an internal combustion engine (not shown), is mounted a control ring 6 (stator ring). The control ring 6 forms with its outer ring surface 7, an inner race for rollers 9 of the motor 3, which are enclosed by outer support rings 8, and also receives the pump wheel 5 of the pump 2, which is mounted centrally in the housing 1. Rollers 9 of the roller-cell pump 2, arranged in the pump wheel 5, lie up against the inner ring surface 10 of the control ring 6. The control ring 6 has slits or channels 11 that connect the chambers 12 of the roller-cell motor 3, which are bounded by the rollers 9, with the chambers 13 enclosed by the rollers 9 of the roller-cell pump 2 (cf. FIG. 2). The pump/motor unit 2, 3 and its housing 1 is mounted on a drive shaft 14, preferably the crankshaft of an internal combustion engine (not shown), which drives the pump wheel 5 at the speed of the engine. The driver medium flows in through a central inlet 15 in the drive shaft 14 and is then distributed via the passages 11 to the chambers 12, 13 between the rollers 9 of the motor 3 and of the pump 2, and after performing work, the driving medium flows out through return lines 16 and reenters the circuit (cf. the unnumbered flow arrows in the chambers 12, 13 of FIG. 2).

Figure 1:
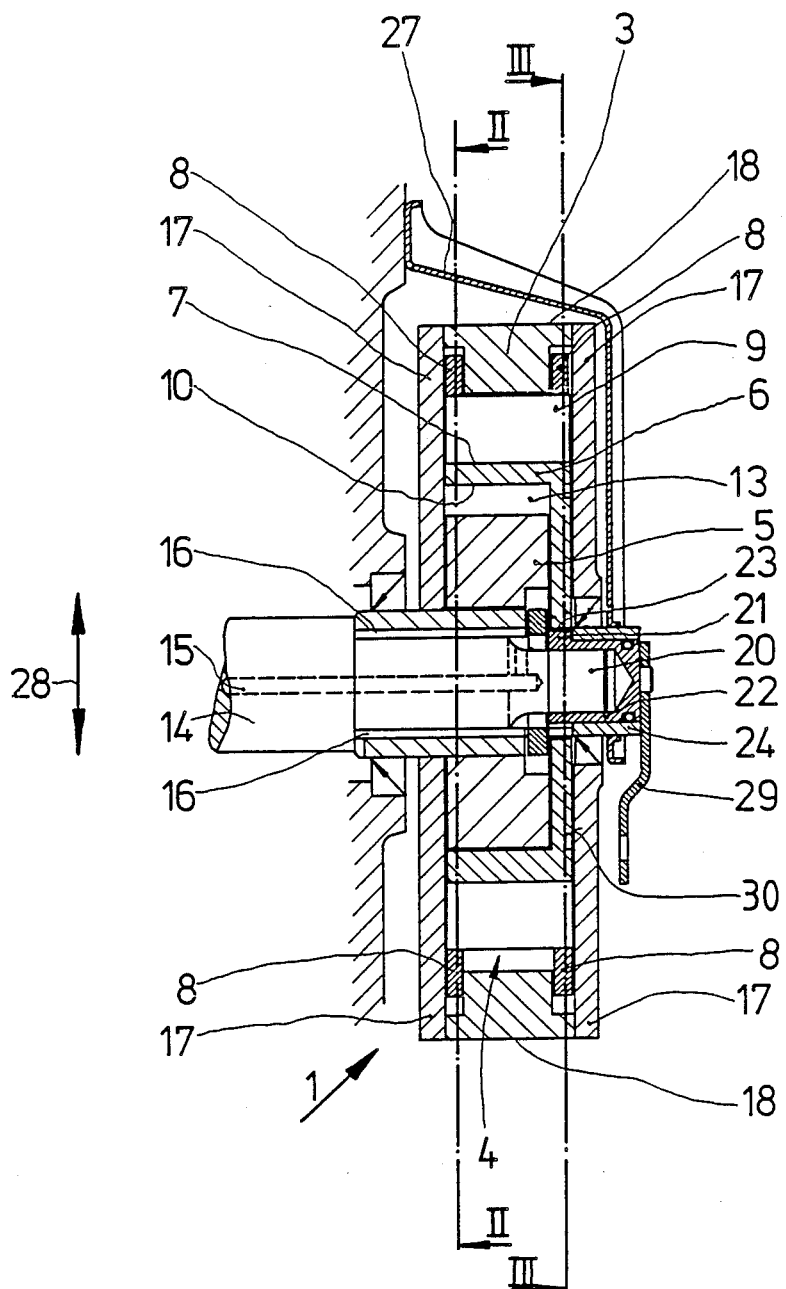
FIG. 1 is a longitudinal section, with bearings depicted schematically, through a radially nested pump-/motor unit comprising a roller-cell motor enclosing a roller-cell pump.
Figure 4:
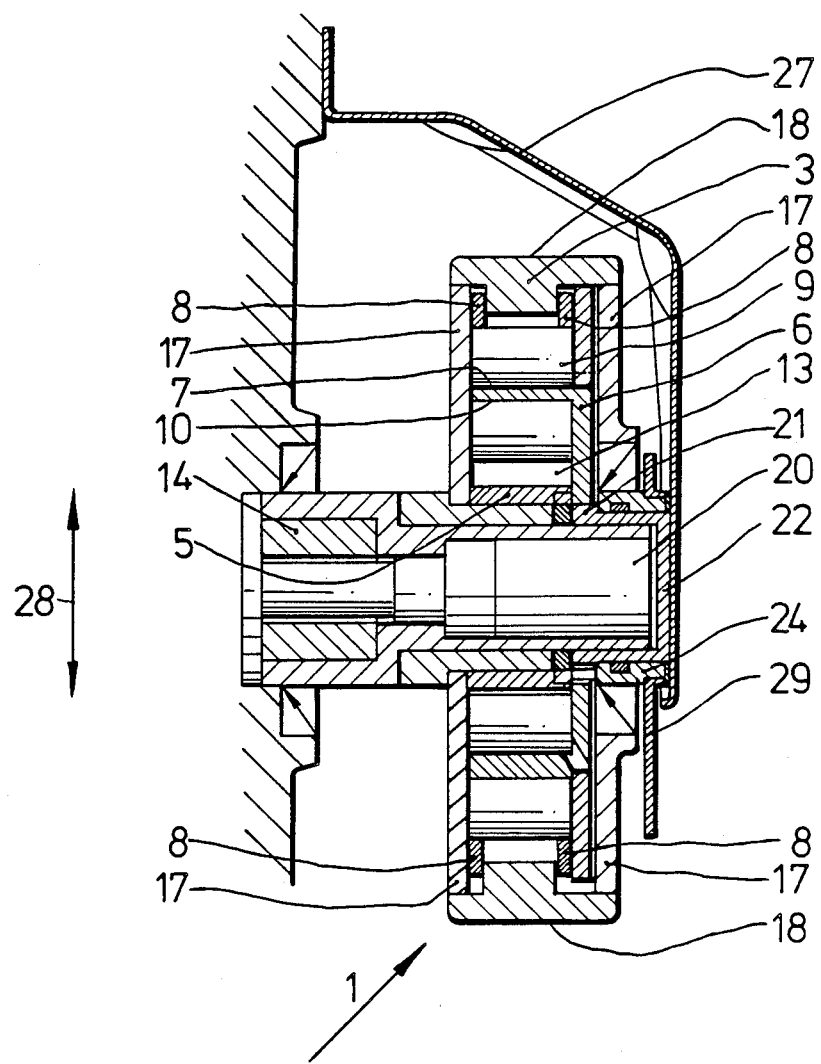
FIG. 4 is a longitudinal section, with bearings depicted schematically, through another embodiment of a radially nested pump/motor unit comprising an outer roller-cell motor enclosing a roller-cell pump.

As shown in FIGS. 1 and 4, the housing 1 of the pump/motor unit 2, 3, including the side plates 17, rotates around the axis of the shaft 14 at the speed of the motor, and the outer surface of the housing 1 provides a belt surface 18 via which the variable speed of the motor can be transmitted to the auxiliary units by means of a belt (not shown).

Figure 3:
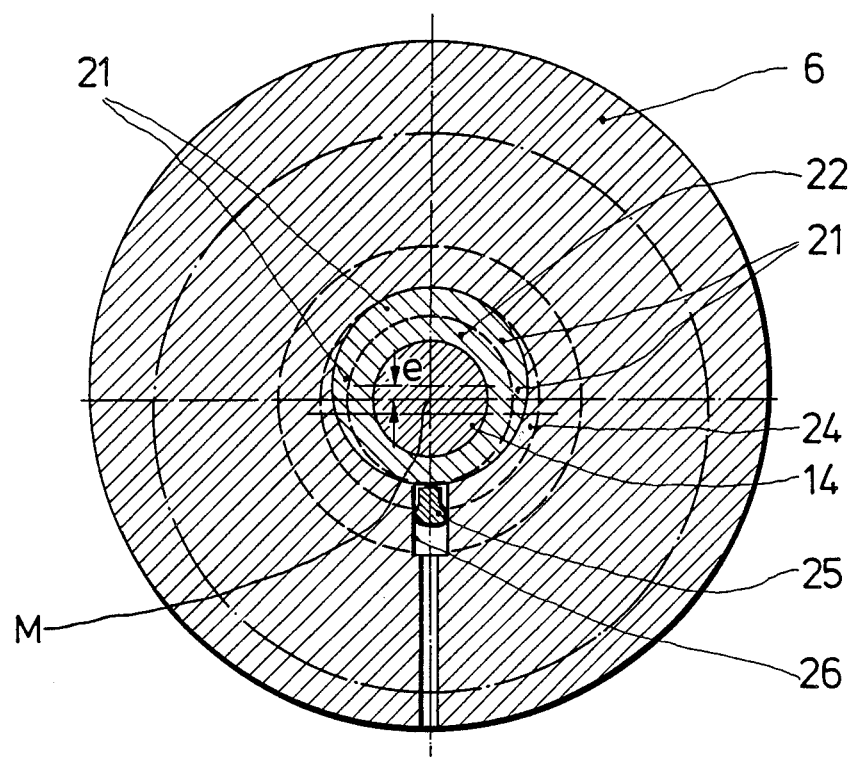
FIG. 3 is a section on the line III—III in FIG. 1.
Figure 5:
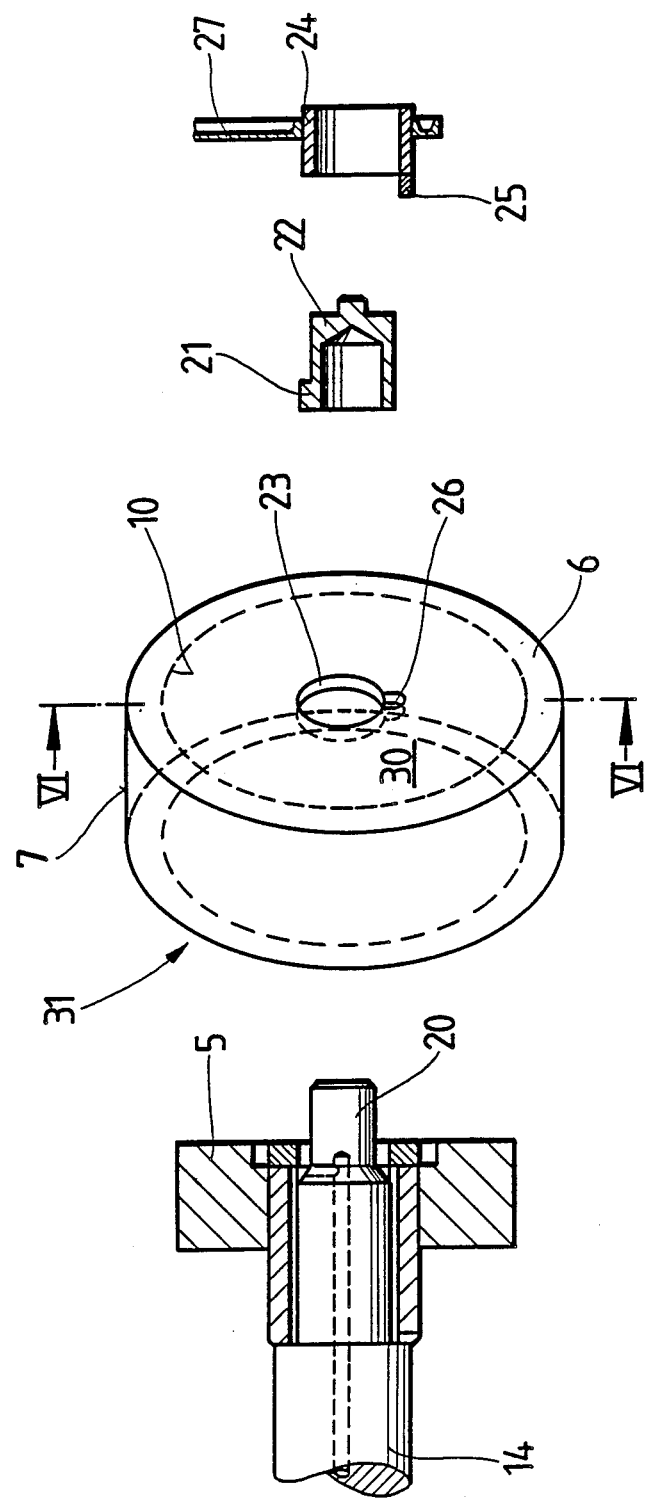
FIG. 5 is an exploded view of components essential to the invention.
Figure 6:
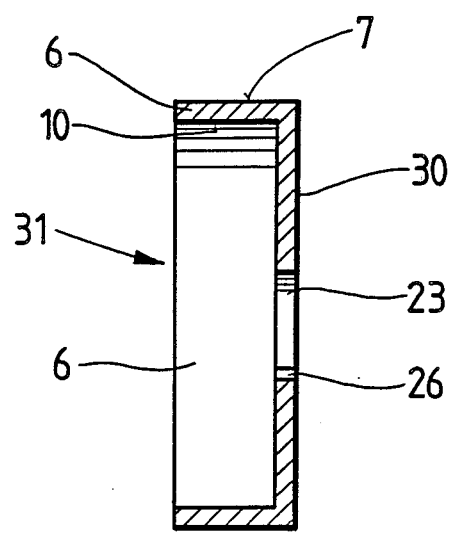
FIG. 6 is a cross-sectional view of the adjustment or control ring.

In the embodiment according to FIG. 3 the conversion ratio of pump speed to motor speed of the hydrostatic drive unit 2, 3 is adapted to the current load conditions by movement of the ring 6 in the direction of the arrow 19 (FIG. 2), i.e. by rotation in the clockwise direction around the pump wheel 5 of the pump 2, mounted centrally in the housing 1, or in the counterclockwise direction. So that the ring 6 can be rotated, as shown in FIG. 5, the shaft 14 that drives the drive unit 2, 3 passes through the side plates 17 with its projecting end 20 running in a shaft-end bushing 22 having an eccentric, sickle-shaped shoulder 21. The sickle-shaped shoulder 21 engages in a throughbore 23 in the front face 30 of the control ring 6 (see FIG. 6). Arranged on the part of the shaft end bushing 22 not provided with the sickle-shaped shoulder 21 is an outer bushing 24 having on its end face a projecting nose 25 that engages in a radial groove 26 in the control ring 6 (FIG. 3). The outer bushing 24 is, as shown in FIG. 1, secured by means of locking means 27 to the engine block (shown only in part) of an internal combustion engine, so that in the embodiment according to FIG. 1, the control ring 6 can be moved radially upwards or downwards as indicated by arrow 28 when a control lever 29 secured to the shaft end bushing 22 is moved round. Since the outer bushing 24 is held in position by the locking means 27, operation of the lever 29 moves the shaft end bushing 22 around the shaft journal 20, whereby the sickle-shaped shoulder 21 is moved in the throughbore 23 in the front face 30 of the control ring 6 from the position shown in FIGS. 2 and 3 to one that may be rotated by as much as 180°, thereby causing the control ring 6 to move downward. Rotation of the shaft end bushing 22 through 180° leads to a radial displacement of the control ring 6 by twice the amount of the eccentricity e.

In the embodiment of the drive unit 2, 3 shown in FIG. 4 the shaft end bushing 22 is fixed, instead of the outer bushing 24 as in the embodiment according to FIG. 1, and the control lever 29 is fixed to the outer bushing 24. On rotating the control lever 29 the control ring 6 is rotated in the direction shown by the arrow 19 (FIG. 2); as the outer bushing 24 is rotated, the nose 25 engaging in the groove 26 in the control ring 6 also rotates the control ring 6 as shown by the arrow 19, but the shaft end bushing 22 is held in position by the locking means 27.

To vary the amount of driving medium, and thus the speed of the rotating belt surface 18, the control ring 6, which is of varying thickness and has opposite eccentricities, can either be displaced upwards or downwards in the radial plane (see arrow 28) or alternately rotated about its longitudinal axis (see arrow 19), thereby moving the amount of the greatest eccentricity—measured from the center M of the pump wheel 5—into another sector or region of the drive unit and correspondingly increasing or decreasing the volume of the chambers 12, 13 of the pump and motor in opposite senses.

What is claimed is:

1. An adjustable hydrostatic drive unit, particularly for the auxiliary units of motor vehicle internal combustion engines, comprising a pump and a motor arranged radially one inside the other in a common housing around a drive shaft and an eccentric control ring, having inner and outer curved ring surfaces, arranged between said pump and said motor, said pump and motor being connected together hydraulically and having delivery volumes adjustable in opposite senses, characterized in that the drive shaft passes through the side plates of the housing and has a projecting end that rotates in an inner bushing that receives said shaft end and has an eccentric, sickle-shaped shoulder that engages in a throughbore in a front face of said control ring, and said inner bushing is coaxially surrounded by an outer bushing having a nose that projects into a radial groove in said control ring, whereby relative rotation of said inner and outer bushings effects radial or rotary displacement of said control ring.

2. A drive according to claim 1, wherein the nose is arranged on the end face of the outer bushing.

3. A drive according to claim 1, comprising means for locking the inner bushing against rotation and a control lever fixed to the outer bushing, whereby rotary movement of said control lever effects said rotary displacement of said control ring.

4. A drive according to claim 1, comprising means for locking the outer bushing against rotation and a control lever fixed to the inner bushing, whereby rotary movement of said control lever causes said eccentric sickle-shaped shoulder to rotate in said throughbore thereby causing said radial displacement of said control ring.

5. A drive according to claim 1 wherein said inner and outer curved ring surfaces of said control ring have opposite eccentricities.

* * * * *